United States Patent
Leeki-Woo

[19]

[11] Patent Number: 5,810,293
[45] Date of Patent: Sep. 22, 1998

[54] EMERGENCY LANDING AUXILIARY APPARATUS FOR AN AIRCRAFT USING A PARACHUTE

[76] Inventor: Leeki-Woo, Hanshin Apt. 5-202, Cho up-dong Jin-ku, Pusan, Rep. of Korea

[21] Appl. No.: 751,113

[22] Filed: Nov. 15, 1996

[51] Int. Cl.$^6$ .................................................... B64D 17/80
[52] U.S. Cl. ........................................... 244/139; 244/147
[58] Field of Search ................................... 244/139, 147, 244/140, 141

[56] References Cited

U.S. PATENT DOCUMENTS

| | | | |
|---|---|---|---|
| 1,770,954 | 7/1930 | Stone | 244/147 |
| 1,776,629 | 9/1930 | Kugler | 244/147 |
| 2,478,758 | 8/1949 | Frieder et al. | 244/139 |
| 2,510,843 | 6/1950 | Townshend | 244/147 |
| 3,315,920 | 4/1967 | Caughron | 244/139 |
| 3,833,192 | 9/1974 | Vitack et al. | 244/139 |
| 5,673,845 | 10/1997 | Martin et al. | 244/139 |

*Primary Examiner*—Galen L. Barefoot
*Attorney, Agent, or Firm*—Notaro & Michalos P.C

[57] ABSTRACT

The present invention relates to an emergency landing auxiliary apparatus of an aircraft using a parachute, whereby a rapid accident crash of an aircraft can be avoided through releasing the chute set inside an apparatus accepting room 11 and the landing distance of the aircraft can be reduced in case of an emergency landing. Therefore, the present invention is effective in decreasing a possible loss of lives and the damage of the aircraft itself. When a relay switch is pushed, the DC current produced in a DC generator is applied to a timer via an overvoltage overcurrent preventer so as to operate the timer in several seconds and drive a speed reduction motor, the worm turns to rotate the worm gear in 90-degree arc, so that the leg of the cover is in a ready state not to be released out of the 90-degree arc turned cam, when the operation of the timer is suspended for several seconds, a power interrupt detector detects the interrupted operation and immediately supplies an electric power to the detonator, whereby the compressed air of the compressed air tank is released through the hole of a casing, the cover rushes out of the apparatus accepting room and the parachute is released so as to support the emergency landing of the aircraft.

1 Claim, 9 Drawing Sheets

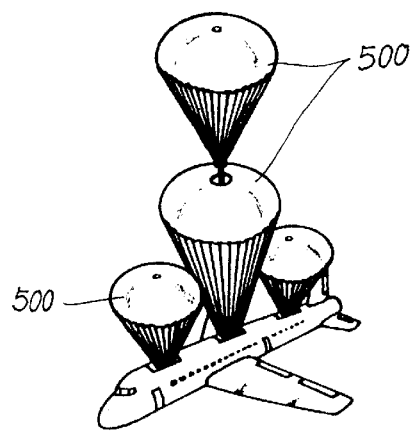
Fig. 10
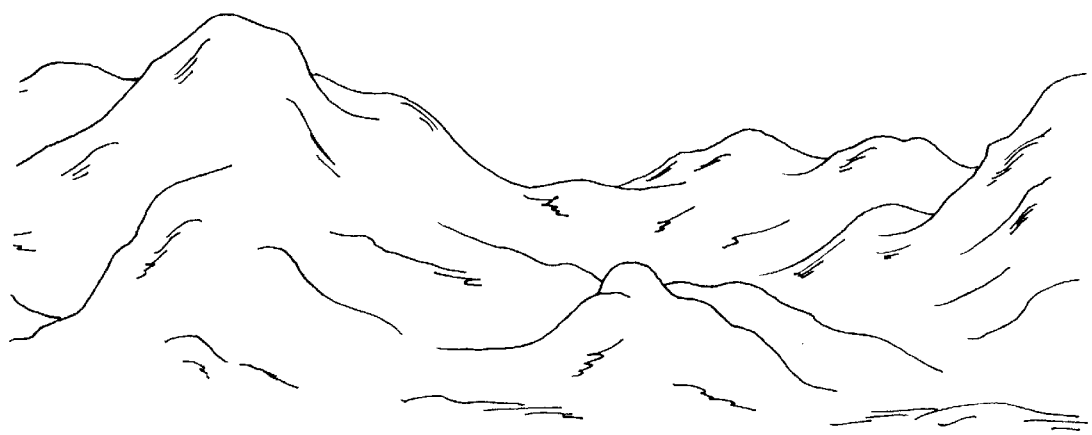

under the patents of the present invention.

EMERGENCY LANDING AUXILIARY APPARATUS FOR AN AIRCRAFT USING A PARACHUTE

FIELD OF THE INVENTION

The present invention relates to an emergency landing auxiliary apparatus for an aircraft using a parachute.

BACKGROUND OF THE INVENTION

An aircraft is known as a safe transportation means. However, when there happens an accident caused by flying high up in the air at high speed, the aircraft rapidly drops to be crashed. In such case, almost passengers may die. Though a military aircraft has a parachute for a person to make a parachute jump from the aircraft, the civil aviation carry so many passengers cannot provide so many personal parachutes.

SUMMARY OF THE INVENTION

The present invention relates to an emergency landing auxiliary apparatus of an aircraft using a parachute, whereby a rapid accident crash of an aircraft can be avoided through releasing the chute 500 set inside an apparatus accepting room 11 and the landing distance of the aircraft can be reduced in case of an emergency landing. Therefore, the present invention is effective in decreasing a possible loss of lives and the damage of the aircraft itself.

BRIEF DESCRIPTION OF THE PRESENT INVENTION

FIG. 10 shows the use of the present invention.

DESCRIPTION OF THE PREFERRED EMBODIMENT

The present invention is effective in reducing a possible loss of lives and the damage of a craft itself in that a rapid accident crash of an aircraft can be avoided through releasing the chute set inside an apparatus accepting room 11 and the landing distance of the aircraft can be reduced in case of an emergency landing.

The operation of the present invention may be described in detail as follows.

Figure 1:
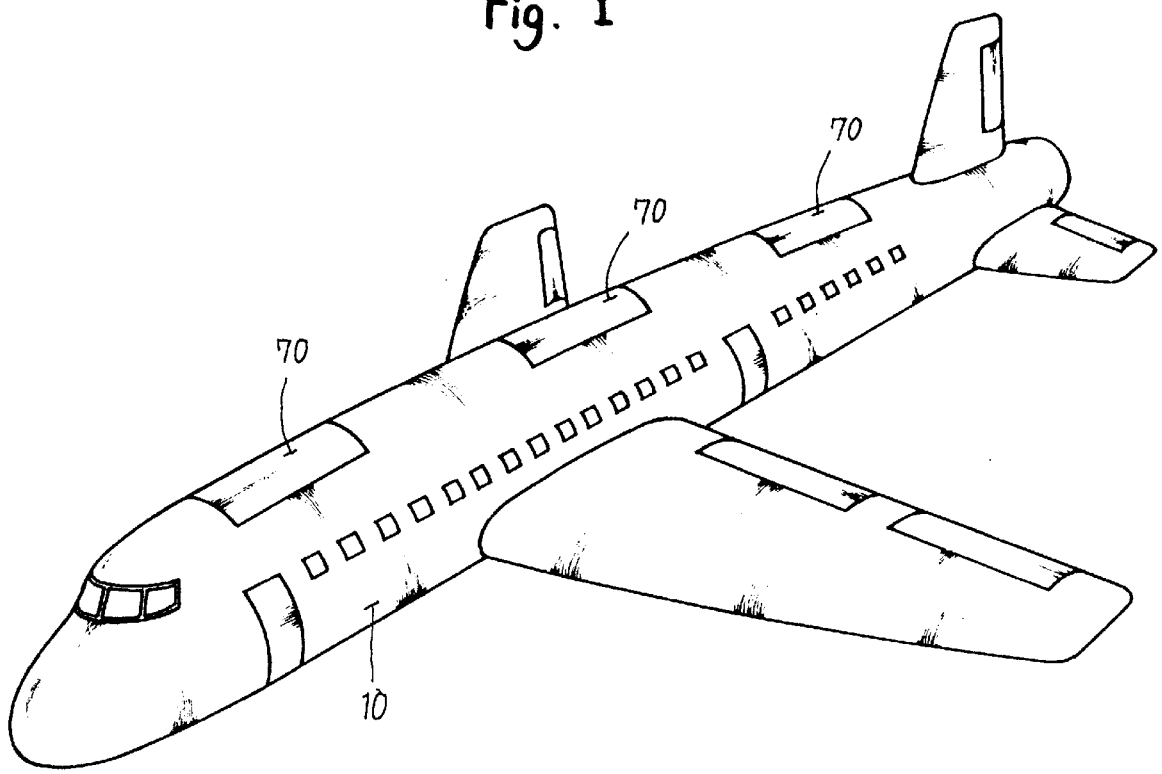
FIG. 1 is a view of the aircraft applying the present invention.
Figure 2:
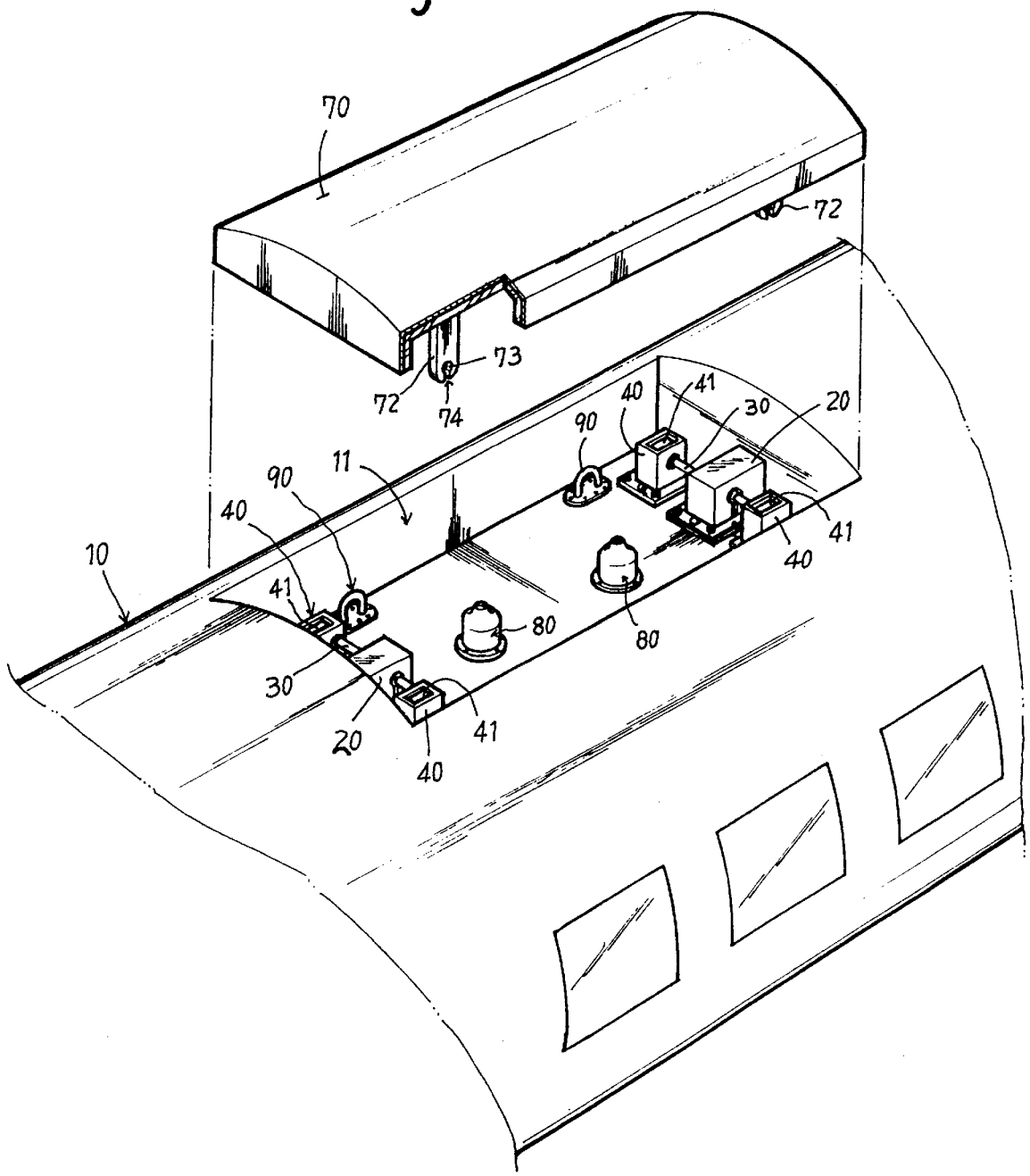
FIG. 2 shows a three-dimensional struction of the present invention.
Figure 3:
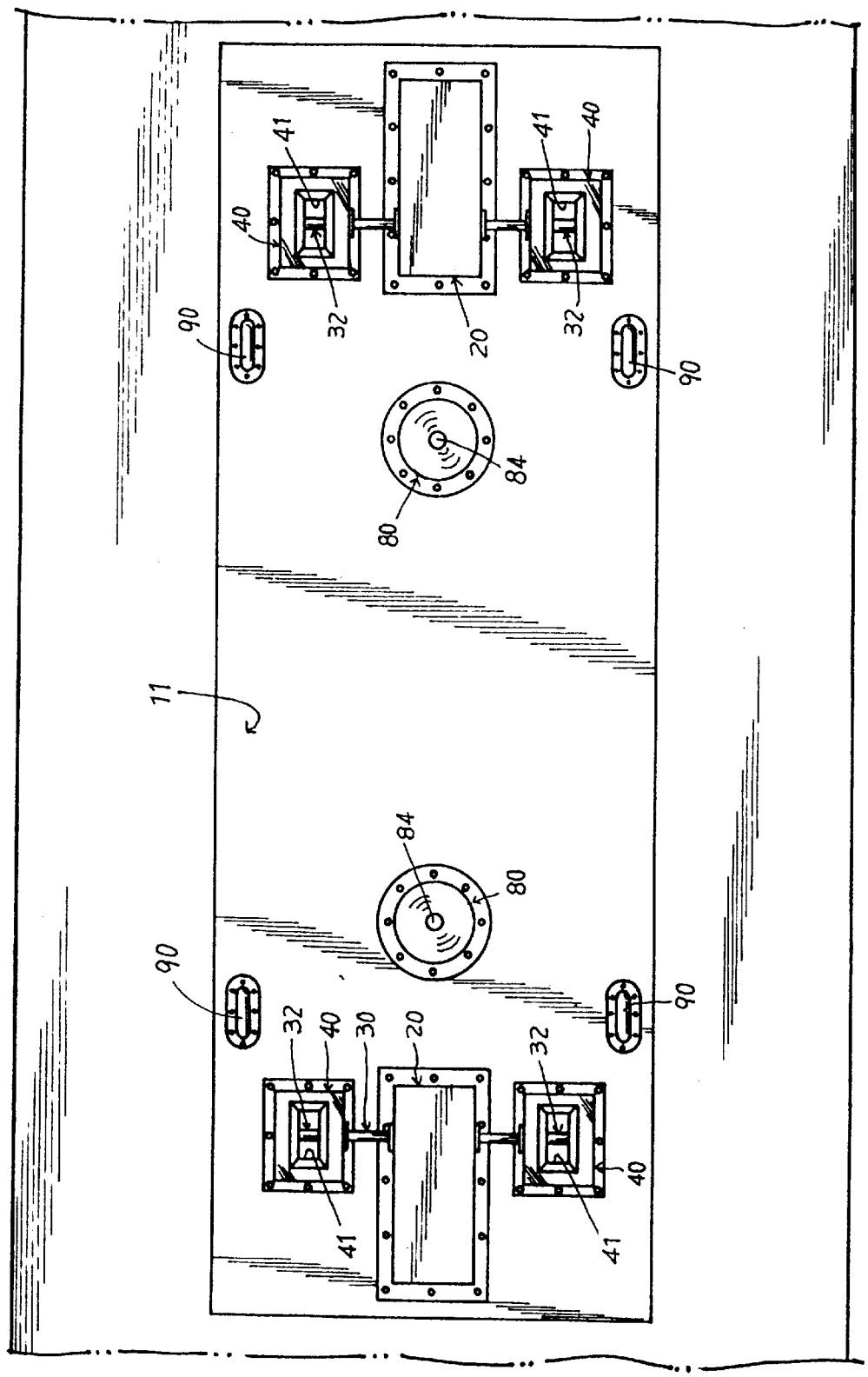
FIG. 3 is a plane view of the apparatus according to the present invention.
Figure 4:
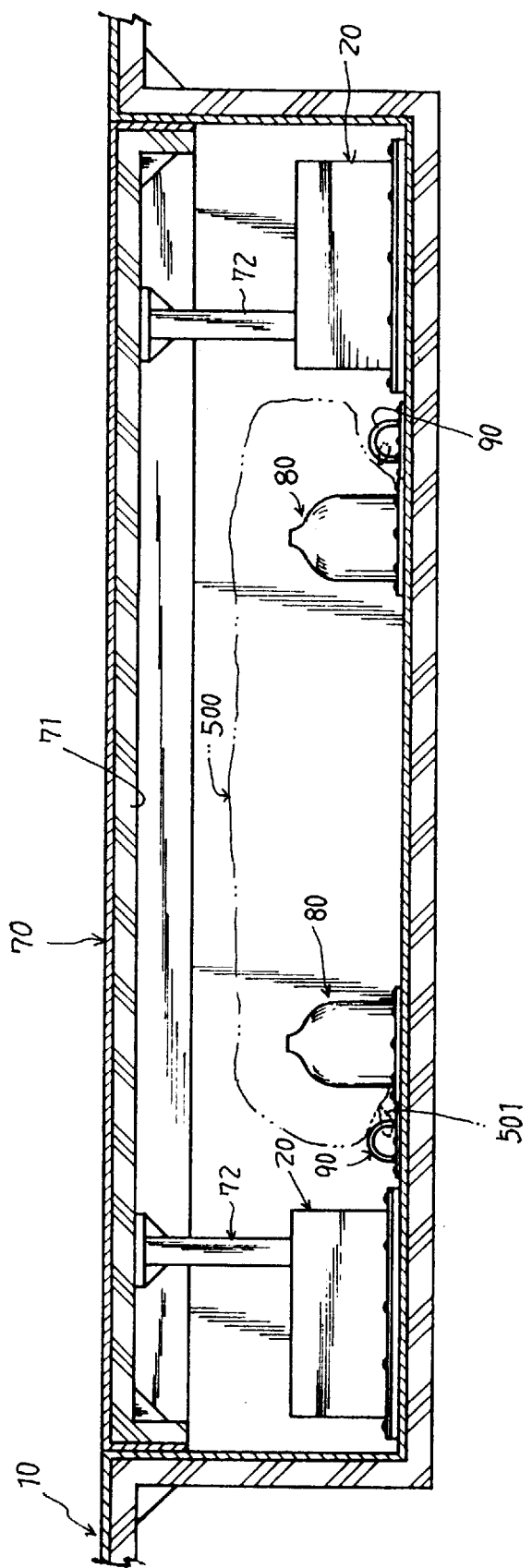
FIG. 4 is a vertical sectional view of the present invention.
Figure 5:
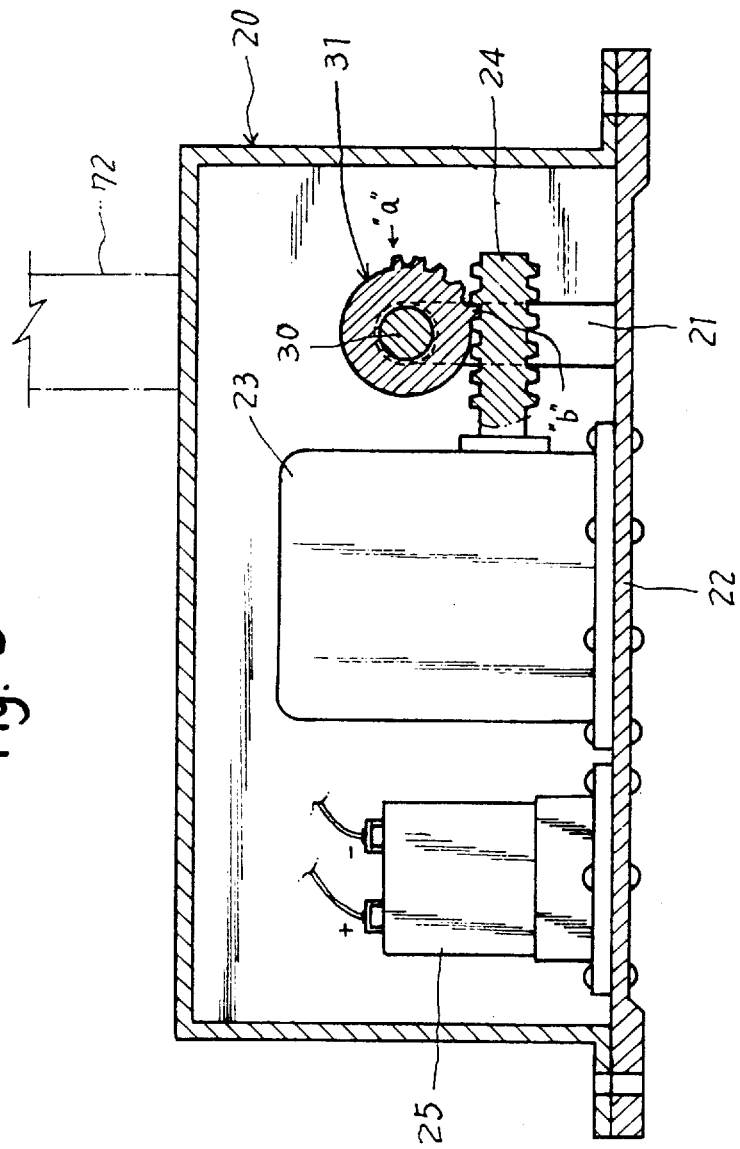
FIG. 5 through FIG. 8 are sectional view of the present invention.
Figure 6:
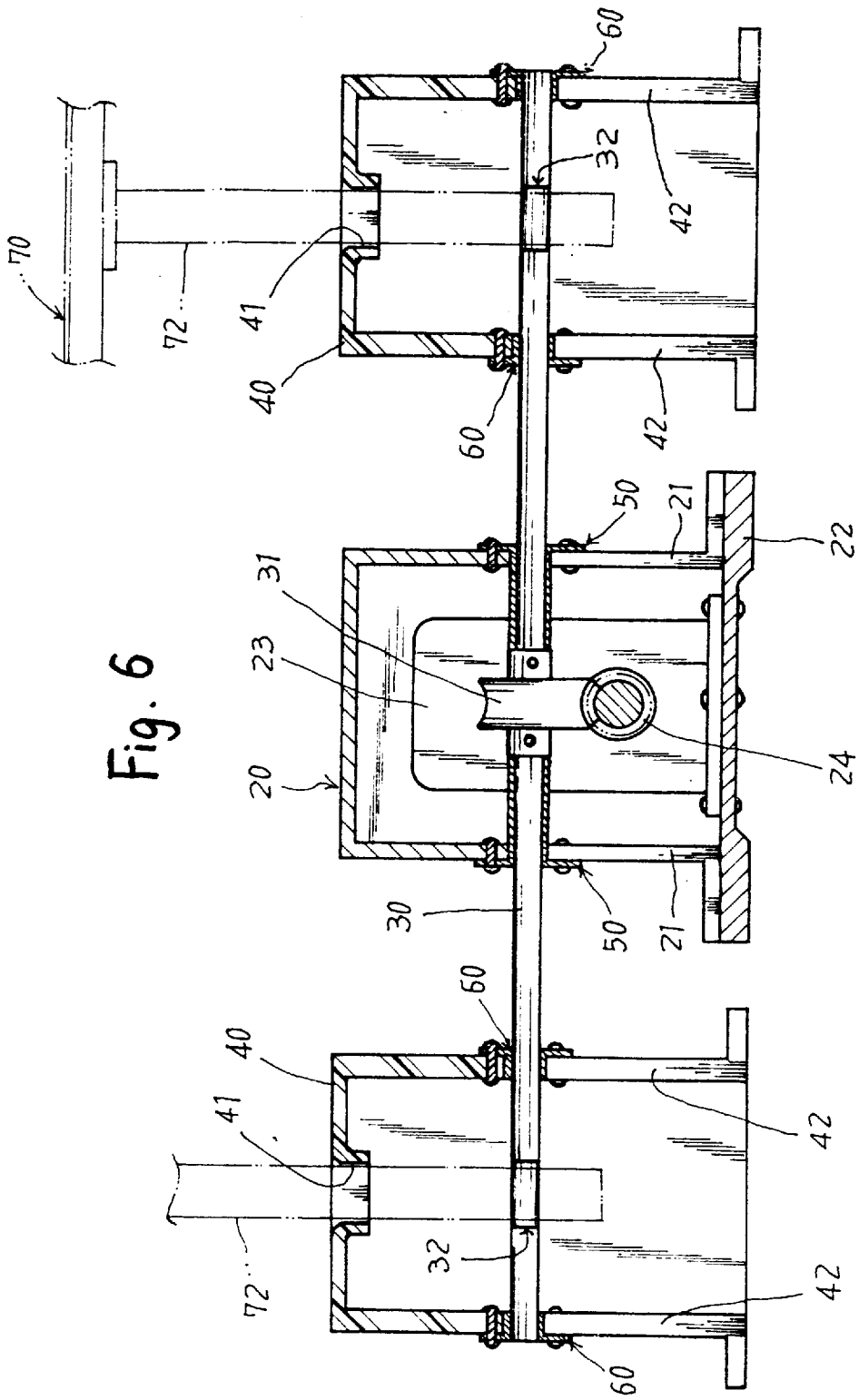
Figure 7:
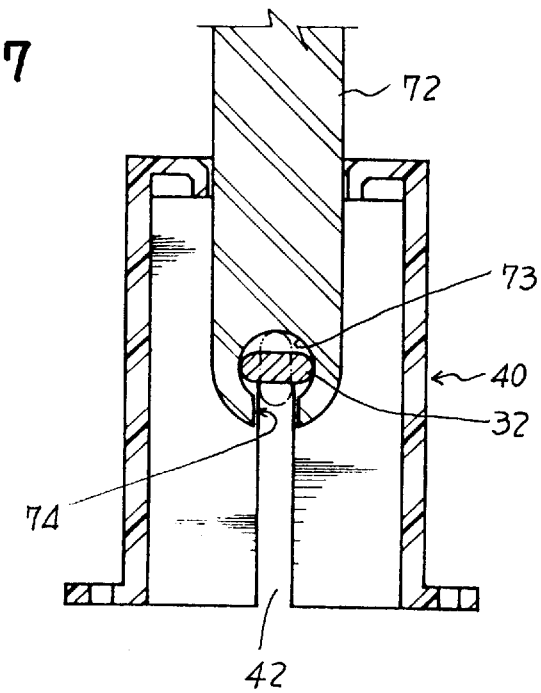
Figure 8:
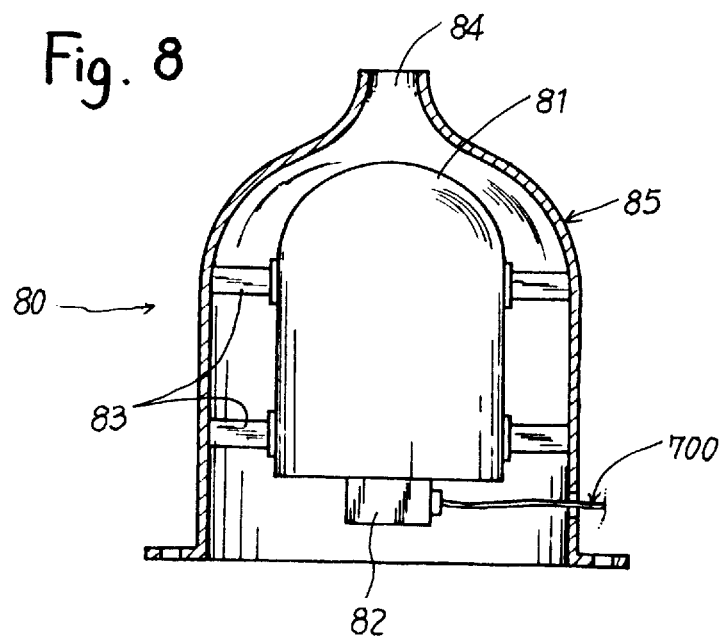
Figure 9:
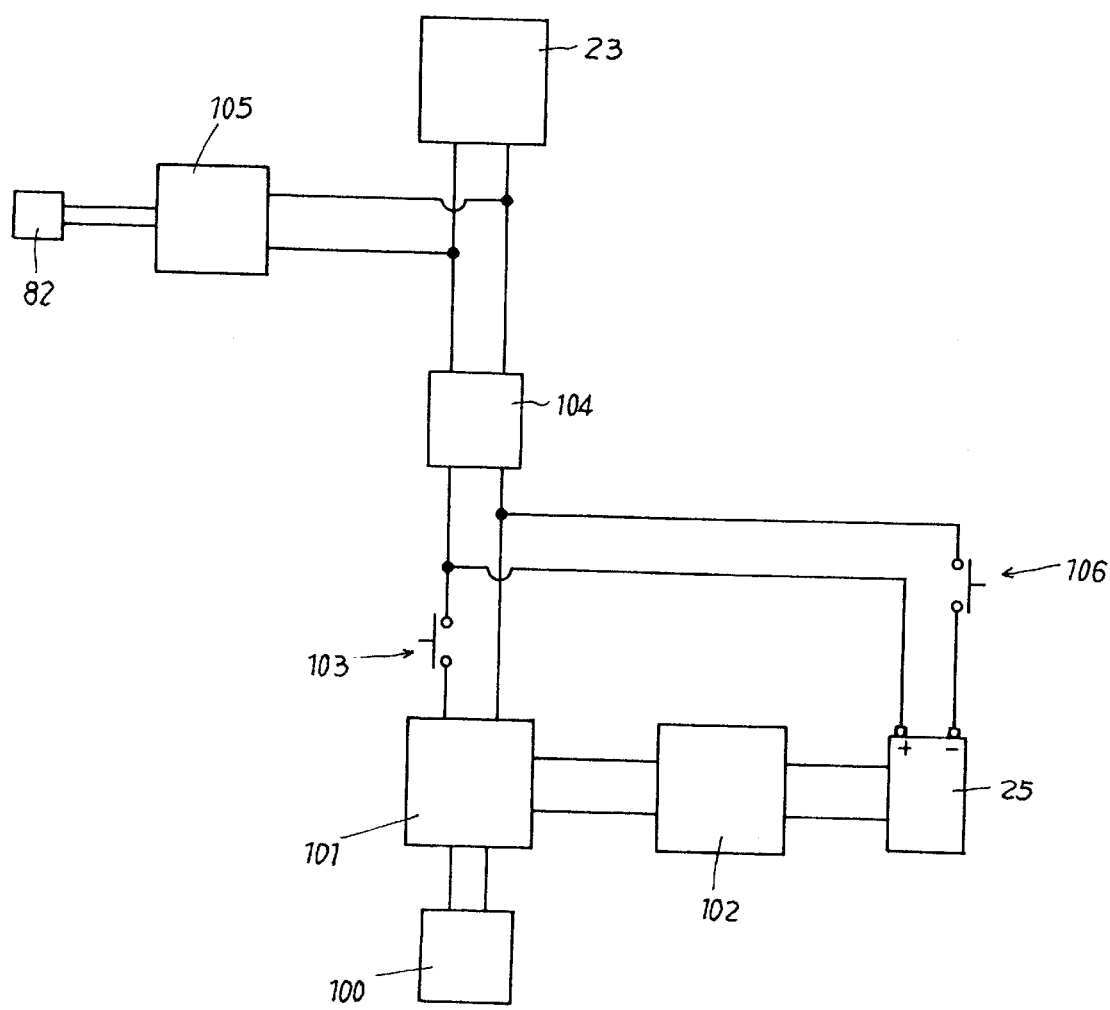
FIG. 9 is a circuit diagram of the present invention.

Referring to FIG. 4, a leg 72 of a cover 70 is inserted into a body 40 and the cam 32 of a pintle 30 is fixed within the hole 73 of the cylindrical leg 72 at a level as shown in FIG. 7, so that the leg 72 itself cannot be released out of the body 40. In FIG. 5, the cam 32 may be inserted into the cylindrical hole 73 of the leg 72 by adverse-turning a speed reduction motor 23 so as to arrange the teeth of a worm gear 31 at a right-handed turn site of a 90-degree arc.

Accordingly, the cam 32 also turns in a 90-degree arc to be upright as in FIG. 7.

When inserting the leg 72 into the hole 41 of the body 40, the cam 32 is inserted into the hole 41 through the cut-open hole 74 and the speed reduction motor 23 rotates so as to turn to a left-hand (as shown in FIG. 5).

Accordingly, the cam 32 also turns in a 90-degree arc to be horizontal in the the cylindrical hole 73 of the leg 72, which prevents the leg 72 form being released out of the body 40. In case of an emergency landing, a crash landing or a steep diving with a breakdown, the relay switch 103 in a pilot's seat is to be pressed down. Then, a timer 104 which is designed to be operated in several seconds after pushing the relay switch 103 is supplied with an electric power so as to immediately drive the speed reduction motor 23. The warm gear 31 turns to the right-hand according to the rotation of the worm 24.

The worm gear 31 does not turn any more even though the teeth moves to a 90-degree arc by turning in a left hand because the worm gear 31 has teeth of about a quarter of the cylinder's length. Accordingly, the cam 32 also turns in a 90-degree arc to be upright as in FIG. 7, which is a state that the leg 72 is released from the cam 32 and the cover 70 is also released out of the aircraft body 10.

This operation is performed in several seconds as long as for the operation of the timer 104.

If the timer is suspended in several seconds of its operation, the power supply to the speed reduction motor 23 is interrupted, which is detected by a power interrupt detector 105.

With the operation of the power interrupt detector 105, a current is released from a condenser provided therein and the denotator 82 explodes. Therefore, the compressed air in a compressed air tank 81 is rapidly released with a high pressure through the hole 84 of a casing 85 and the cover 70 is rushed out to the atmosphere so as to successfully release the parachute 500 up to the atmosphere.

According to the release of the parachute, the acceleration of the aircraft is rapidly decreased and the impact to the aircraft body 10 is lessened during an emergency landing, which can minimize a loss of lives and the demage of the aircraft itself.

The parachute 500 can be constructed with a double-structure as shown in FIG. 10 and at least one parachute can be installed in an aircraft according to the weight and the size of the aircraft.

The battery 25 and the relay switch 106 of the present invention are applied for the safe of the present invention. Even though the relay switch 103 does not work, the auxiliary relay switch 106 can make the timer 104 be supplied with an electric power from the battery 25 for operation.

This is very effective in case of a breakdown in the DC generator 100 or a false operation.

I claim:

1. An auxiliary emergency landing apparatus for an aircraft having an aircraft body with a front section, a rear section and a center section, the apparatus comprising:

means defining a first chamber in the front section, a second chamber in the center section and a third chamber in the rear section;

a parachute in each chamber, each parachute being connected to the aircraft and having a storage position for being stored in its respective chamber and a deployed position deployed out of the aircraft body for slowing movement of the aircraft;

a cover for each of the chambers, each cover closing a respective parachute in its respective chamber;

each cover having a plurality of legs extending into the chamber, each leg having a cylindrical opening and a slot communicating with the cylindrical opening;

a plurality of receiving bodies in each chamber, each receiving body being adapted to receive one leg of a cover;

at least one motor in each chamber, each motor having a worm for rotating and a worm gear engaged with each worm for rotating with rotation of the worm;

a shaft connected to the worm gear in each chamber, the shaft extending into at least one of the receiving bodies and into the cylindrical opening of a leg in said at least one receiving body, the shaft having a cam portion with an oblong cross-section in the cylindrical opening, the oblong cross-section extending across the slot and preventing removal of the leg from the receiving body in a first position of the shaft, the shaft being rotatable by rotation of the motor, the worm and the worm gear, to rotate the shaft by 90° to a second position to align the oblong cross-section with the slot to allow removal of the leg from the receiving body;

at least one compressed air source in each chamber, each compressed air source having an opening facing the cover and being activatable to discharge compressed air through the opening to push the cover away from the chamber when the shaft is rotated by the motor to the second position to align the oblong cross-section with the slot;

a detonator operatively connected to the compressed air source for activating the source to release compressed air through the opening; and control means for controlling the motor to rotate the shaft to align the oblong cross-section with the slot for release of the legs from the receiving body and thereafter to activate the detonator for relaying compressed air to remove the covers from the chambers for deploying the parachutes.

\* \* \* \* \*